United States Patent
Sharp

[11] Patent Number: 5,259,895
[45] Date of Patent: * Nov. 9, 1993

[54] METHOD OF BUILDING DOUBLE WALLED STORAGE TANKS

[76] Inventor: Bruce R. Sharp, 126 Leland Way, Marco Island, Fla. 33937

[*] Notice: The portion of the term of this patent subsequent to Oct. 24, 2006 has been disclaimed.

[21] Appl. No.: 830,356

[22] Filed: Jan. 31, 1992

Related U.S. Application Data

[60] Division of Ser. No. 343,855, Apr. 26, 1989, Pat. No. 5,167,142, which is a continuation-in-part of Ser. No. 186,190, Jul. 5, 1988, Pat. No. 4,875,361.

[51] Int. Cl.$^5$ .............................................. B32B 17/04
[52] U.S. Cl. ...................... 156/69; 156/292; 156/172; 220/420; 220/445; 220/466; 220/469; 29/455.1; 73/49.3
[58] Field of Search ................. 156/69, 166, 169, 171, 156/172, 173, 174, 175, 187, 189, 190, 191, 292; 73/49.1, 49.2, 49.3; 29/455.1; 220/420, 445, 446, 466, 469, 645

[56] References Cited

U.S. PATENT DOCUMENTS

| | | | |
|---|---|---|---|
| 3,335,903 | 8/1967 | Anderson | 220/645 |
| 3,394,841 | 7/1968 | Anderson | 220/645 |
| 3,412,891 | 11/1968 | Bastone et al. | 220/645 X |
| 3,661,294 | 5/1972 | Pearson et al. | 220/645 |
| 4,537,328 | 8/1985 | Keesee et al. | 220/445 |
| 4,676,093 | 6/1987 | Pugnale et al. | 73/49.2 T |
| 4,739,659 | 4/1988 | Sharp | 220/445 X |
| 4,875,361 | 10/1989 | Sharp | 220/445 X |
| 4,923,081 | 5/1990 | Weaver et al. | 220/445 X |
| 5,115,936 | 5/1992 | Bartlow | 220/469 X |
| 5,143,244 | 9/1992 | Kauffman | 73/49.2 T |

Primary Examiner—David A. Simmons
Assistant Examiner—Mark A. Osele
Attorney, Agent, or Firm—Charles R. Wilson

[57] ABSTRACT

A method of making a storage tank comprises forming a cylindrical-shaped inner tank with support ribs and forming an outer wall comprised of a series of sections which are at least partially separated from the inner tank's walls between each set of support ribs. Each outer wall section is bonded to the top areas of the walls of the support ribs. The inner and outer walls of the system are both strengthened by the dual side wall support ribs. Secondary containment is provided by the outer wall. A monitored storage tank system is provided by the use of a leak detection means to monitor the closed space defined by the rib interiors, the outer wall and the inner tank wall.

20 Claims, 3 Drawing Sheets

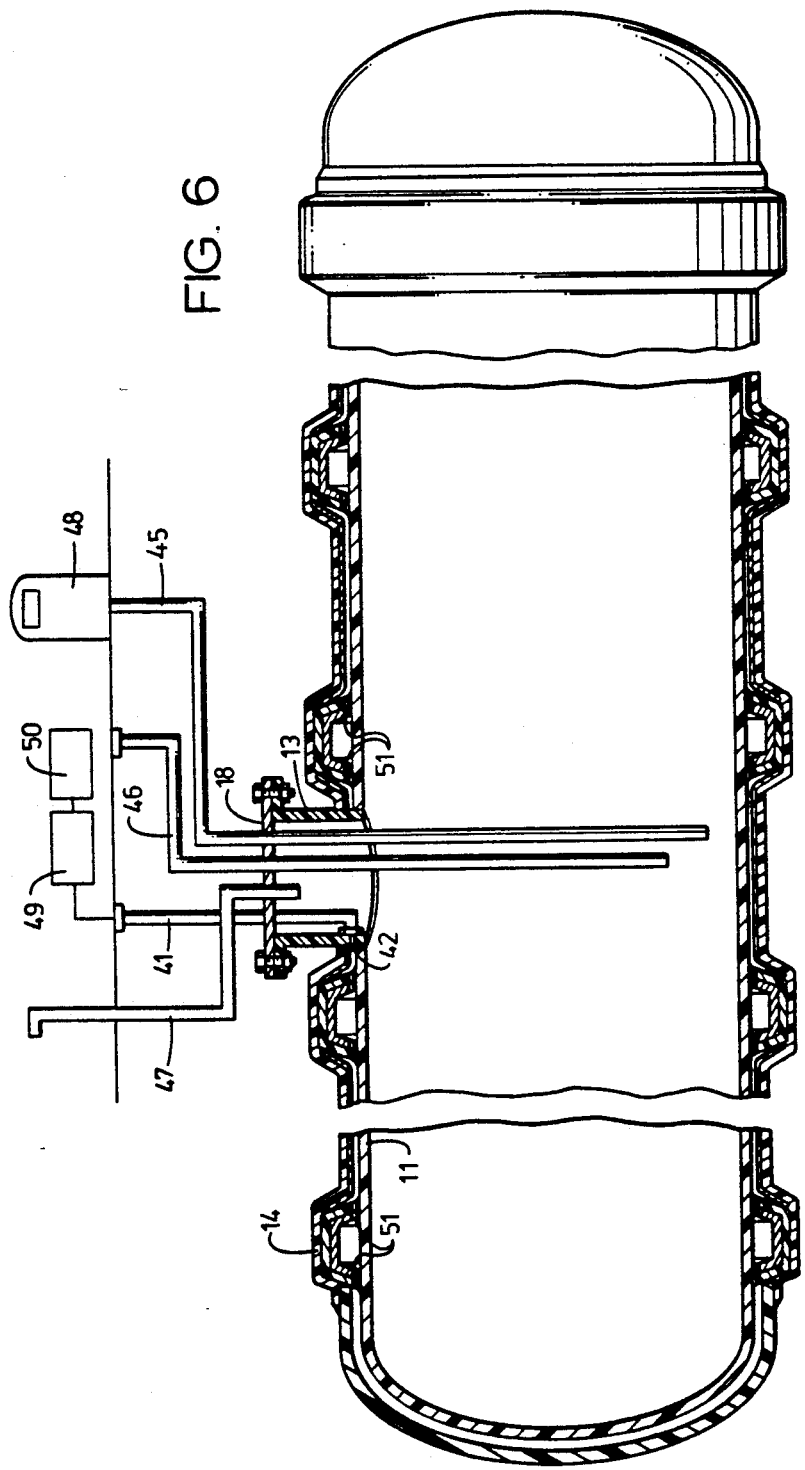
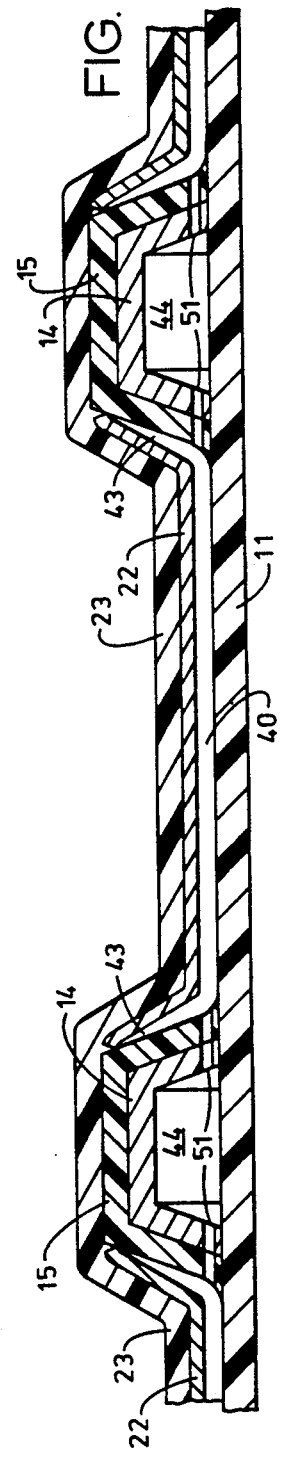

METHOD OF BUILDING DOUBLE WALLED STORAGE TANKS

This is a division of "Double Walled Storage Tanks With Dual Side Wall Support Ribs", Ser. No. 07/343,855, filed Apr. 26, 1989, now U.S. Pat. No. 5,167,142, which is a continuation-in-part of "Double Walled Storage Tanks With Common Rib Support", Ser. No. 07/186,190, filed Jul. 5, 1988, now U.S. Pat. No. 4,875,361.

This invention relates to storage tanks. More particularly, the invention relates to ribbed underground storage tanks which are double walled and which have common dual sided support ribs.

BACKGROUND OF THE INVENTION

Commercial and industrial storage tanks are widely used for storing a great variety of liquids. Some of these liquids are highly corrosive and/or are inflammable. The service life of a storage tank will vary, depending upon environmental conditions, including the liquid being stored. Eventually, however, the tank will become corroded and develop leaks. This can result in a significant danger to the environment and health of nearby residents. For example, storage tanks are commonly used for storing gasoline at service stations. Gasoline, of course, is highly-inflammable and is capable of posing a significant health and safety hazard if not properly contained. Federal as well as local regulations govern the structure of such storage tanks.

Heightened public awareness of the danger posed by storage tanks (particularly underground gasoline storage tanks) has led to additional governmental regulations. Recent proposed regulations will soon require most storage tanks to have secondary containment means and possibly a fail safe design feature to guard against accidental soil, water, and air contamination. Secondary containment means must be capable of containing leaked liquid from the storage tank. Rigid double walled tanks made from sheet metal have been suggested as one alternative. While effective for containment purposes, such tanks, as presently available, are costly to build and difficult to install because of their weight. The tanks are built by basically forming two rigid tanks and placing one inside the other.

Tanks made from fiberglass reinforced resinous material are also extensively used. One common method of making these tanks comprises utilizing a reuseable cylindrical-shaped half-mold in the formation of the tank's body. Initially, layers of fiberglass followed by a resinous coating are applied to the mold or chopped fiberglass/resin streams are simultaneously directed onto the mold and subsequently cured. Sufficient applications of the fiberglass and resin are made until a wall thickness is obtained which has the desired strength. Next, cardboard rib forms, four to six inches wide, are placed completely around the covered mold at approximately sixteen inch intervals and fiberglass/resin applied. The cardboard forms result in a cylindrical-shaped tank with ribs. The purpose of the ribs is to add strength to the tank. The mold is finally removed. A cylindrical-shaped wall, including the support ribs are produced in this stage of the method. An end cap is either fabricated during the cylinder wall-making step or added after the mold is removed. The above steps are repeated to obtain a second half-tank. The two half-tanks are then joined together by appropriate sealing means. The formed tank is representative of a tank constructed by adding spaced support ribs to the outer surface of a cylindrical-shaped inner tank and then securing said ribs to the tank.

The single-walled tank above described is capable of being installed in the ground and, in fact, is of the type which has been used extensively for the past twenty years. Double walled tanks made of fiberglass reinforced resinous material are made by forming a second outer tank in two horizontal halves. The formed inner tank and outer tank halves are assembled and sealed to form a double walled storage tank system based on two rigid tanks with ribs therebetween.

A second method of making tanks from fiberglass reinforced resinous material utilizes a removable split half-mold with shapes for forming the support ribs and end cap along with the main body. After fiberglass and resinous material are applied to the mold and cured, the mold is removed. Next, the interior portions of the rib areas are filled with a filler material or bridged over with a cardboard insert and, fiberglass/resin applied so as to form a substantially smooth tank interior. A second tank half is formed in the same manner and joined with the first tank half. The formed tank is representative of those tanks wherein the support ribs are built into the inner tank as initially made. A double walled tank is made essentially by forming two additional horizontal tank halves, placing the initial single walled tank inside one horizontal half-tank and joining the second horizontal half-tank to the first.

U.S. Pat. No. 4,561,292, contains a description of another method of building a double walled storage tank. As is readily apparent from the patent and above discussion, building a double walled storage tank system with fiberglass and resin by known methods is very labor intensive. There is also a concern about possible weakening and/or breaking of any support ribs away from the tank walls due to an inability to maintain close tolerances. Additionally existing designed double walled tanks having ribs between the tank walls require sufficient strength in the rib side wall to prevent its crushing. Also the current methods do not provide for the interior and exterior walls between the ribs to rest upon each other in an unsealed manner to create a composite support between the ribs. Recent concerns about leaked tanks have heightened the need for an efficient and economical manner of building double walled storage tank system.

There has now been discovered a method whereby storage tanks are built with a double wall for secondary containment in an efficient, yet economical manner. Such tanks can also be equipped with means to monitor for any leakage.

SUMMARY OF THE INVENTION

A method of building a strengthened double walled ribbed storage tank system with secondary containment capability comprises the steps of (a) forming a cylindrical-shaped inner storage tank with support ribs which protrude from the outer surface thereof, and (b) forming an outer wall which substantially follows the contour of the ribbed outer surface of the inner tank, said outer wall characterized in being at least partially separated from the inner tank's surface and ribs, side wall surfaces and further is attached to the ribs, top walls such that a set of dual side wall ribs are formed.

The outer wall derives its strength from the dual side wall support ribs so as to withstand external and internal load forces and acts as a secondary containment means to contain any liquid which may leak from the inner tank. Provision can be made to monitor the interior spaces defined by the outer wall, rib interiors and inner tank walls.

BRIEF DESCRIPTION OF THE DRAWINGS

FIG. 6 is a side view of a storage tank system of this invention illustrating the use of monitor means.

FIG. 7 is an enlarged sectional view of two dual side wall support ribs of the storage tank system of FIG. 6.

DETAILED DESCRIPTION OF THE INVENTION

Figure 1:
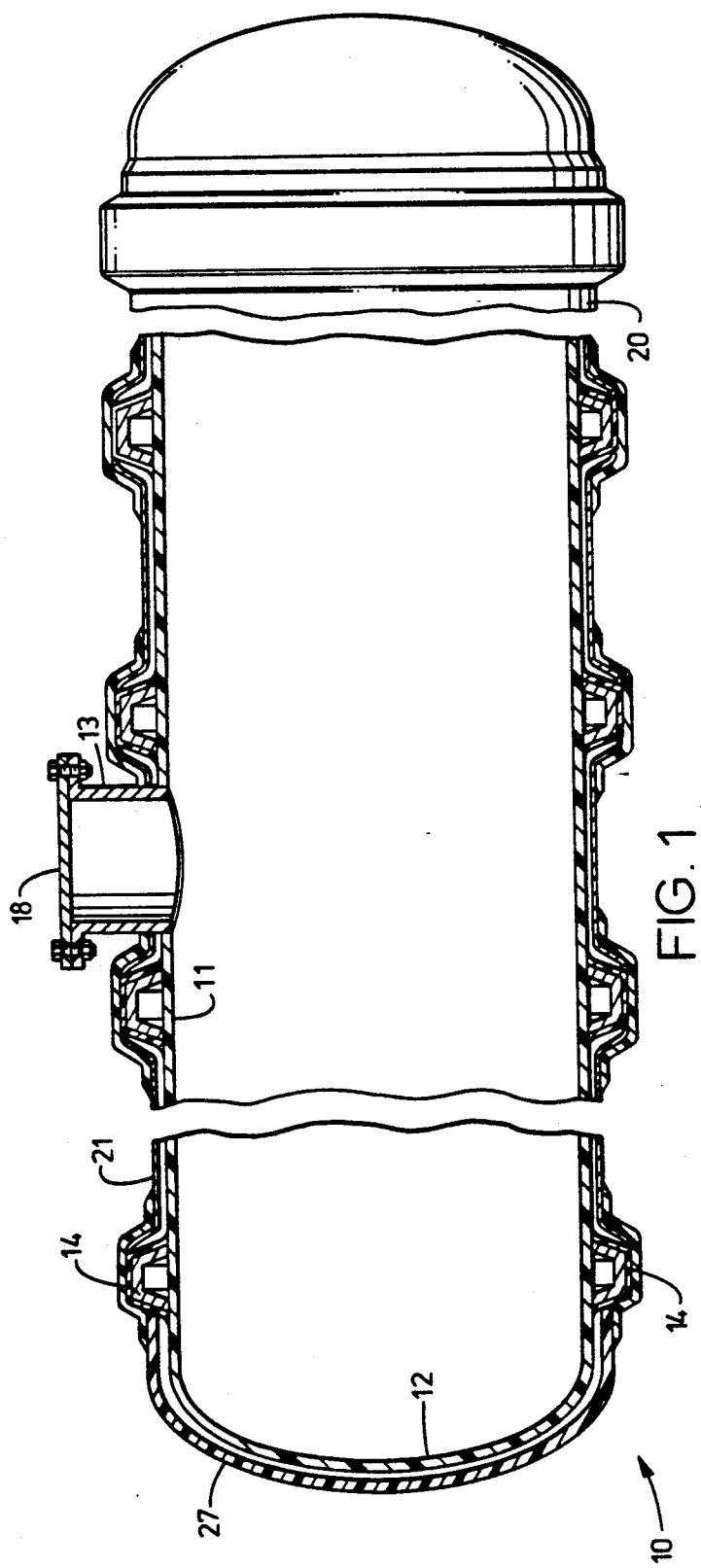
FIG. 1 is a side view of a double walled ribbed storage tank system having support ribs surrounding an inner tank and an outer wall made of sections of a solid sheet material over spaces between the ribs.
Figure 2:
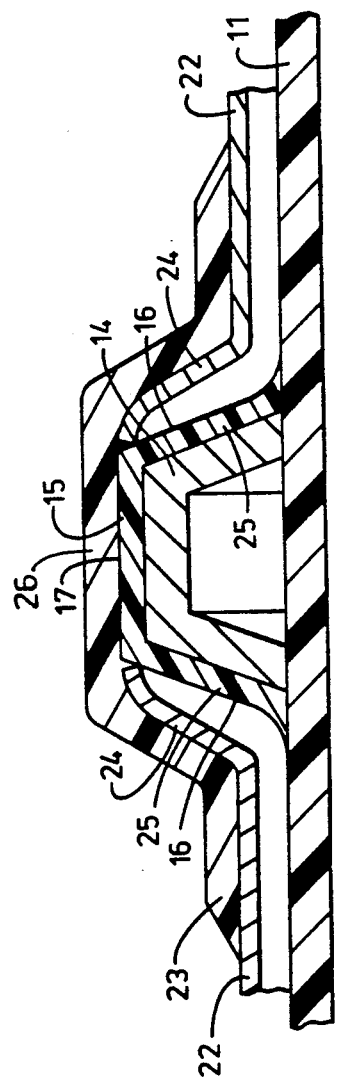
FIG. 2 is an enlarged sectional view of a dual side wall support rib found on the storage tank system of FIG. 1.

With reference to FIG. 1, there is shown a double walled storage tank system 10. The inner storage tank of the type used in FIG. 1 is well known and is widely used, especially in the gasoline service station industry. Such tanks comprise main body 11, end caps 12, and manhead 13. Main body 11 and end caps 12 are made of a conventional fibrous reinforced resinous material. Circumferentially extending support ribs 14 are positioned around inner tank body 11 and are secured to the tank body. The ribs can be formed when the inner tank is made or subsequently added to the outer surface of a smooth walled inner tank. In the latter case as shown in FIGS. 1 and 2, preferably, an overlay 15 of fibrous reinforced resinous material is used to secure the ribs.

Each support rib 14 on the storage tank 10 has two generally vertical side walls 16 and a generally flattened top wall 17. The ribs are typically formed from cardboard. They can also be in the form of a foam mold such that the foam and the rigid overlay 15 act as support ribs. The ribs act as support so that the weight of the tank, including the contents therein are evenly distributed and add strength needed to withstand earth load stresses. The support ribs in FIG. 1 are hollow and have a trapezoid shape. They form open spaces when placed on the tank body.

A sufficient number of openings are found in the storage tank 11 to allow for various access lines to the interior of the tank. For instance, a fill pipe, dispensing line and vent pipe can enter the storage tank at various points in the tank's surface, but preferably all enter through the cover 18 and manhead 13.

In accord with this invention, an outer wall comprised of a series of sections is formed over the inner storage tank. Each section is at least partially separated from the inner tank's walls and is bonded to the top wall of the support ribs. The sections do not exceed 90% of the height of the ribs. In effect, the top portions of the ribs protrude from the outer surface of the storage tank system. It has been found that constructing a double walled storage tank in this manner utilizes the support ribs to strengthen both the walls of the inner tank and the outer wall. A composite strengthening is obtained. In effect, a double walled tank system is obtained in an efficient and economical fashion.

In a preferred embodiment, the wall sections extend between the ribs a distance of less than about 75% of the height of the ribs. In a more preferred embodiment, each wall section extends a distance of from about 1% to about 50% of the height between the ribs. Preferably the inner and outer walls between the ribs are in contact with each other in an unsealed fashion providing a composite strengthening of the interior and exterior tank walls by such contact, yet still capable of maintaining a monitoring space within the contact areas between the walls.

One method of forming the outer wall 20 comprised of wall sections 21 and which is illustrated in FIGS. 1 and 2 is to place solid sheet material 22 between the ribs. The sheet material is then secured to the top walls of the support ribs by bonding material 23. Examples of such solid sheet materials include metal sheets and fiberglass/resin sheets. The metal sheet can be a thin gauge steel sheet with a diamond grid pattern on the surface which faces the inner tank. The fiberglass resin sheet preferably has a stucco appearance on the side facing the inner tank. It is, thus, preferred that the solid sheet material has an irregular surface on at least its inside surface to ensure a seal is not formed by its contact with the inner tank walls.

The bonding technique used to secure wall sections 21 to the top wall of the support ribs will depend on the materials of construction of the sections, per se, and the support rib surface covering. Preferably, the support ribs are secured to the inner tank by an overlay of a resinous material and the outer wall sections are made of fibrous reinforced resinous material. In this case, additional resinous material is used for the bonding purpose.

Each support rib now has dual side walls 24 and 25 with only one top 26. Thus, the outer wall substantially follows the contour of the ribbed outer surface of the inner tank. The outer wall is at least partially separated from the inner tank's surface and the rib's side wall surfaces. The ribs 14 strengthen both the inner tank 11 and the outer wall 20. The result is a storage tank system which is economically built with a minimum of labor intensive steps and which has sufficient strength without excessive wall thickness to meet or exceed mandated structural requirements. The walls of the storage tank system are both able to withstand internal and external load forces encountered during use.

Outer end caps 27 are preformed, preferably of fiberglass reinforced resinous material and positioned over the inner tank's ends. A space between the end caps is provided for. As shown, the end cap 27 is bonded to a support rib 14.

Figure 3:
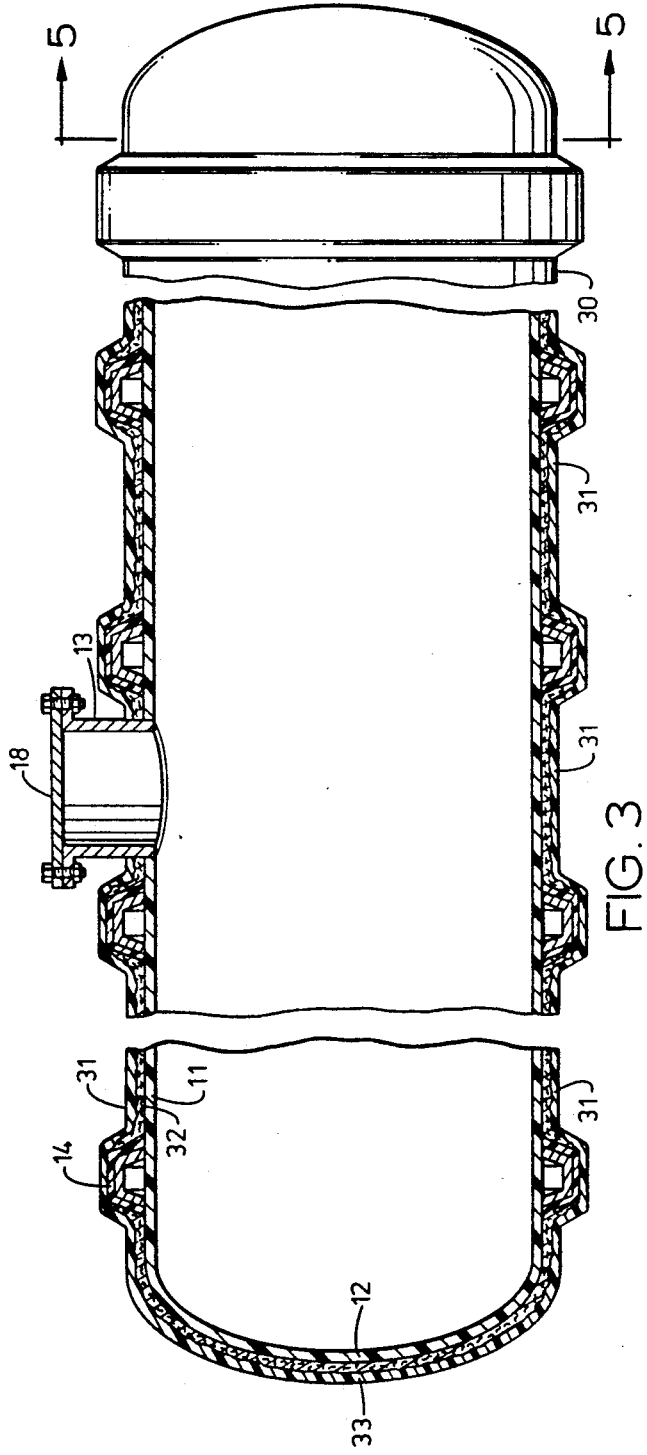
FIG. 3 is another double walled storage tank of this invention wherein outer wall sections are made from fibrous reinforced resinous material.

Outer wall 30 shown in FIG. 3 is a fibrous reinforced resinous material. The wall sections 31 are formed in one method by first applying layers of fibrous reinforcing material 32, e.g. fiberglass on the outer surface of the tank 11 between the ribs 14, including rib side walls, and on the end caps 12. The fibrous reinforcing material can take on many different physical shapes and structures, variously referred to as matting, nets, screens, meshes, and chopped strands. Examples of fibrous materials include fiberglass, nylon, and other synthetic fibrous materials. The fibrous material, if in sheet form, is laid onto the storage tank as a continuous matting. The thickness of the fibrous material is great enough that a subsequently applied resinous material as discussed in the following paragraph will not be able to completely penetrate through it and seal to the inner tank 11.

Once the fibrous reinforcing material is applied, a resinous material is next applied to the reinforcing material and thereafter cured. Several different resinous materials are known for the purpose of reinforcing fibrous material. Such materials include polyesters, e.g. vinylesters, isophthalic polyesters, polyethylene, polypropylene, polyvinylchloride, polyurethane, and polyepoxide. The listed resinous materials used in the construction of the wall sections are not all inclusive, but only illustrative of some of the resinous materials which can be used.

Alternatively, the fibrous material is applied in the form of chopped strands along with the resinous materials described in the previous paragraph. In this embodiment, a separating material discussed in following paragraphs must be applied to the inner tank walls to keep the inner and outer walls separated. Thus, the chopped strand and resinous material are sprayed from separate nozzles of the same spray gun and the outer wall sections formed therefrom on the separating material as the resin cures. Necessarily, there will be some overlap of spray materials onto the top surface of the support ribs. Still another method of forming the outer wall sections is by filament windings. In this method continuous reinforcing fibrous strands are impregnated with resinous material and then wrapped in a crossing pattern over the inner tank. A separating material must be used in this method also.

When needed, a separating material having an impervious outer planar surface is applied to the surface area on the inner tank's outer surface between the ribs 14, including end caps 12. The purpose of the separating material is to ensure that the subsequently applied fibrous reinforcing material and resinous material which form the outer wall 30 comprised of the wall sections 31 and outer end caps 33 will not seal to the inner storage tank.

Separating materials include solid polymeric films as well as foraminous or porous materials which may be sealed on at least one side. Many pliable or semi-rigid materials are usable. Examples of such material are polyethylene, jute, polyurethane foam, polyester foam, polyether foam, fiberglass matting, cotton matting, nylon matting, corrugated cardboard, and asbestos which range from about 0.01 inches to almost 1.0 inch in thickness. A heat seal or sealing material, e.g. a polymeric coating, is used on one surface of any foraminous materials when needed to prevent substantial saturation with a subsequently applied resinous material, Wax, which is subsequently heated and removed is also used as a separating material.

Figure 5:
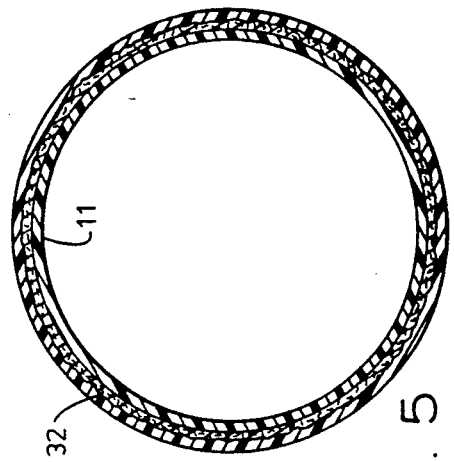
FIG. 5 is an end view of the storage tank system of FIG. 3 taken along line 5—5.
Figure 4:
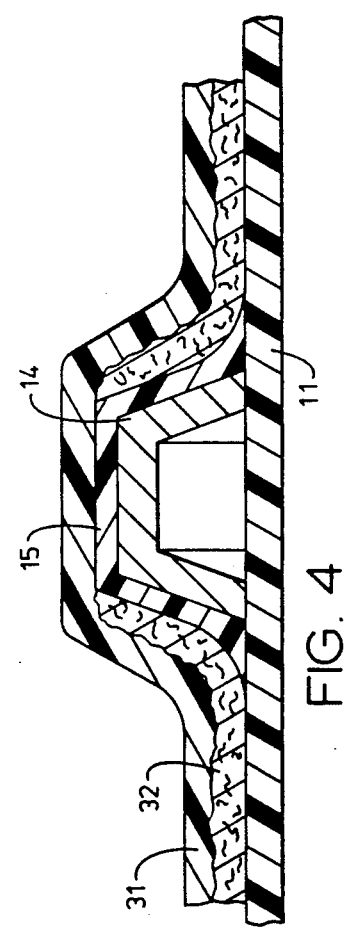
FIG. 4 is an enlarged sectional view of a dual side wall support rib area found on the storage tank system of FIG. 3.

In the embodiment of the invention discussed with reference to FIGS. 3-5 the continuous sheet of fibrous material serves the dual function of being a separating material and a part of the outer wall sections. The sheet of material is about 0.01 inches to about 1.5 inches thick. The resinous material applied to the top surface of the fibrous material forms the outer wall sections and is bonded to the top wall of the support ribs. Complete penetration of resin into the fibrous material is avoided. In effect the portion of the fibrous material sheet adjacent the inner tank is a separating material and the top surface portion together with the resinous material forms the outer wall sections.

The minimum thickness of the separating material must be sufficient to prevent the subsequently applied outer wall from adhering to the storage tank. Accordingly, any shrinkage resulting from formation of the outer wall must be accounted for by having a sheet material thick enough to be partially collapsed, but not compression sealed to the underlying tank surface.

With reference to FIGS. 6 and 7 there is shown a storage tank system of the type described in FIG. 1 wherein the spaces 40 between the support ribs are monitored. An access tube 41 extends from ground level through manhead 13 and access hole 42 so as to be in communication with the closed space 40 under a wall section. The spaces 43 between the secondary side wall rib and the primary side wall rib forming the dual side wall rib which has the common rib top are a part of the closed space. Additionally spaces 44 under the ribs when hollow are also monitored. Preferably all closed spaces between walls 11 and 20 are in communication with each other for monitoring purposes. Communication is accomplished in one method by laying at least one aperture tube along the length of the inner tank 11 prior to placing the ribs thereon. Subsequent steps of securing the ribs to the inner tank, and forming the outer wall are done in a fashion above described. Preferably, at least two aperture tubes are used with one being positioned along the bottom of the tank and one along the top of the tank. Alternatively a tube or rod is used in place of the aperture tube and removed after the final outer wall section is formed. The result being a tank system with a tunnel 51 extending the length of the inner tank's outside surface. Still other ways can be used to provide communication throughout the enclosed areas which may include the hollow areas within the ribs.

Secondary containment of liquid stored in storage tank 11 is provided by the rib interiors and the outer wall 20. Monitoring of the containment means is readily accomplished when said containment space is continuous. The aperture tube or tunnel provides the communication.

Also shown in FIG. 6 are features found on a typical underground storage tank system. Thus, the manhead cover 18 with attachment means (nuts and bolts) provides a sealed primary containment of the gasoline. Access lines comprised of dispensing line 45, fill line 46 and vent pipe 47 extend through the manhead cover 18. Dispensing line 45 extends to dispenser 48.

Any of well known and commercially available monitor means are used for monitoring the spaces between ribs or the total containment space. For example, the closed space can be placed either under a non-atmospheric pressure, i.e. a positive or negative air pressure. Detection means associated with the closed space is capable of detecting any change in pressure resulting from a leak in the overlay or the storage tank. As shown in FIG. 6, there is provided a means for maintaining the closed space under a negative pressure. Conventional vacuum pump 49, together with an associated pressure regulator can be used. A pressure change sensor 50 is a part of the detection means. A pressure gauge serves this purpose adequately. Optionally, an alarm system can be electronically linked with the pressure sensor to audibly or visually warn of a preset significant pressure change. A vacuum is preferred because of a resultant increased composite strength of the storage tank system by drawing the outer tank wall sections between the ribs closer to the inner tank wall.

Another embodiment of the detection means utilizes an analyzer capable of detecting the liquid being stored. Thus, the detection means comprises the analyzer which is communication with closed space. Preferably, a vacuum means for withdrawing gaseous material from the closed space is used for the purpose of obtaining a sample. Thus, in FIG. 6, element 50 is an analyzer capable of detecting selected liquids instead of the pressure change sensor.

Still another detection means utilizes a probe which extends through the access tube so as to monitor for leakage at or near the bottom of the closed space. The probe is capable of detecting preselected liquids or gases. In this embodiment, leakage will ultimately seep to the bottom of the closed space and be detected.

All the leak detection means discussed above can be electronically linked with an alarm system to audibly or visually warn of a pre-set significant change in the closed spaces. The leak detection means and secondary containment means allow for an early warning of a deterioration of either the primary or secondary containment means thereby permitting the necessary repair work to be done before any significant soil or water contamination has occurred.

While the invention has been described with respect to preferred embodiments, it is understood that various modifications may be made without departing from the spirit of the subject invention as defined by the appended claims. For example, the inner tank can be made of metal. The inner tank can also be made in a fashion wherein the ribs are formed with the main body as one piece. Additionally, ribs can be spaced laterally around the inner tank instead of circumferentially. The ribs, themselves, can be any geometric shape desired including square-, rounded or trapezoidal-shaped. The outer wall sections can also be formed such that the top surface of the inner tank is exposed to allow a convenient means of attaching various access lines. All obvious variations are within the scope of the claims.

What is claimed is:

1. A method of building a double walled ribbed storage tank system wherein an inner tank and an outer tank utilize a common set of support ribs for strength, comprising the steps of:
   (a) forming a cylindrical-shaped inner tank having spaced support ribs on the outer surface thereof, each said support rib extending circumferentially around the tank and protruding therefrom and wherein each said support rib has two generally vertical side walls and a generally flattened top wall; and
   (b) forming an outer wall which substantially follows the contour of the ribbed outer surface of the inner tank, wherein sections of the outer wall which are directly over the inner tank are formed at a distance less than about 90% of the height of the ribs and are at least partially separated from the inner tank's surface and at least partially separated from the support ribs' generally vertical side wall surfaces and further wherein the outer wall is attached to the support ribs' generally flattened top walls, wherein the outer wall and the inner tank each derive strength from the support ribs to withstand external and internal load forces and wherein the outer wall acts as a secondary containment means to contain any liquid which may leak from the inner tank.

2. The method claim 1 further comprising the step of placing a separating material on the inner tank between the support ribs and on the support rib side walls prior to forming the outer wall to provide a means whereby the outer wall remains at least partially separated from the inner tank and support rib side walls.

3. The method of claim 2 wherein the sections of the outer wall directly over the inner tank are formed at a distance of from about 1% to about 50% of the height of the ribs.

4. The method of claim 1 wherein the inner tank is made of metal.

5. The method of claim 1 wherein the inner tank is made of a fibrous reinforced resinous material.

6. The method of claim 3 wherein the outer wall is formed of fibrous reinforcing material and resinous material.

7. The method of claim 2 wherein the separating material is sealed on at least one side to prevent substantial migration of resinous material therethrough to reach the inner tank.

8. The method of claim 7 wherein the separating material is a foam, matting, net, screen or mesh which has its outer surface sealed.

9. The method of claim 1 further comprising the step of providing at least one aperture tube along the length of the inner tank through the support ribs so as to provide a means of communication throughout the tank system for continuous monitoring of the inner tank and outer wall to detect leakage.

10. The method of claim 2 wherein the support ribs are hollow and have a trapezoidal shape.

11. The method of claim 2 wherein the outer wall is formed from solid sheet materials.

12. The method of claim 6 further wherein end caps are positioned over the inner tank's ends and the fibrous reinforcing material and resinous material extend over said end caps.

13. A method of building a double walled ribbed storage tank system wherein an inner tank and an outer tank utilize a common set of support ribs for strength, comprising the steps of:
   (a) forming a cylindrical-shaped inner tank having spaced support ribs on the outer surface thereof, each said support rib extending circumferentially around the tank and protruding therefrom and wherein each sad support rib has two generally vertical side walls and a top wall; and
   (b) forming an outer wall which substantially follows the contour of the ribbed outer surface of the inner tank, wherein sections of the outer wall which are directly over the inner tank are formed at a distance less than about 90% of the height of the ribs and are at least partially separated from the inner tank's surface and at least partially separated from the support ribs' generally vertical side wall surfaces and further wherein the outer wall is attached to the support ribs' to walls,
wherein the outer wall and the inner tank each derive strength from the support ribs to withstand external and internal load forces and wherein the outer wall acts as a secondary containment means to contain any liquid which may leak from the inner tank.

14. The method claim 13 further comprising the step of placing a separating material on the inner tank between the support ribs and on the support rib side walls prior to forming the outer wall to provide a means whereby the outer wall remains at least partially separated from the inner tank and support rib side walls.

15. The method of claim 14 wherein the sections of the outer wall directly over the inner tank are formed at a distance of from about 1% to about 50% of the height of the ribs.

16. The method of claim 13 wherein the inner tank is made of metal.

17. The method of claim 13 wherein the inner tank is made of a fibrous reinforced resinous material.

18. The method of claim 17 wherein the outer wall is formed of fibrous reinforcing material and resinous material.

19. The method of claim 14 wherein the separating material is sealed on at least one side to prevent substantial migration of resinous material therethrough to reach the inner tank.

20. The method of claim 19 wherein the separating material is a foam, matting, net, screen or mesh which has its outer surface sealed.

* * * * *